Oct. 21, 1958 D. L. MEYERS ET AL 2,856,819
AUTOMATIC ROCKET LAUNCHER
Filed June 23, 1953 5 Sheets-Sheet 2
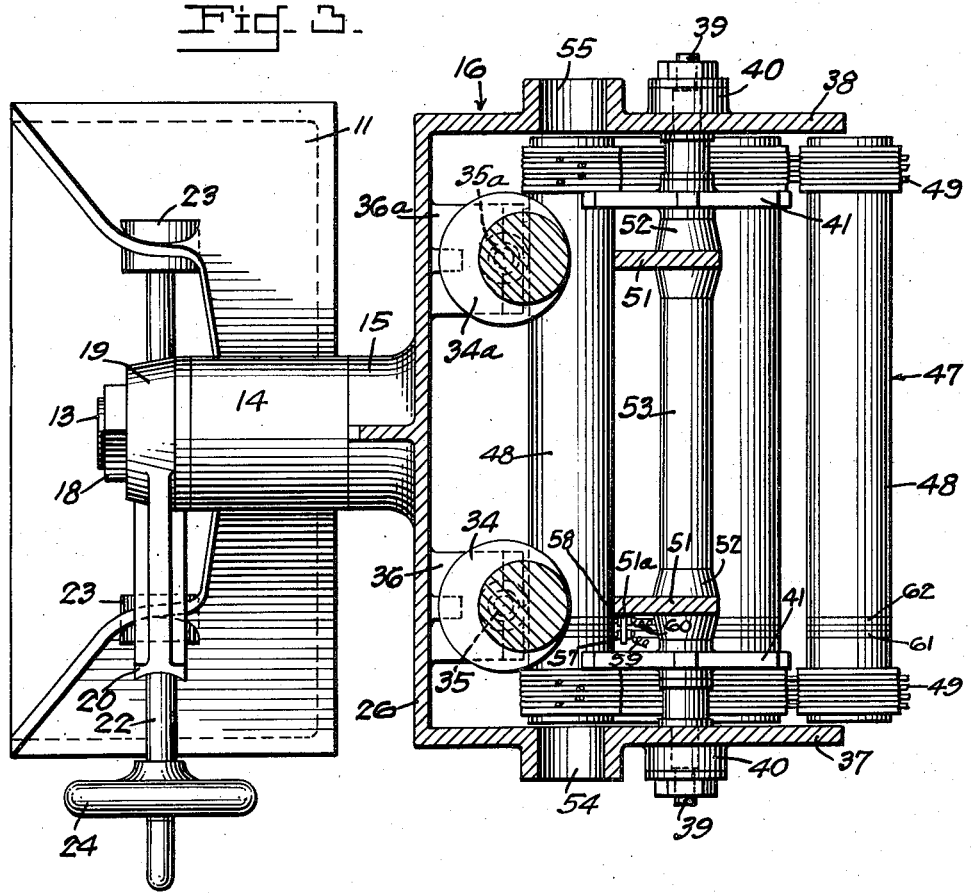
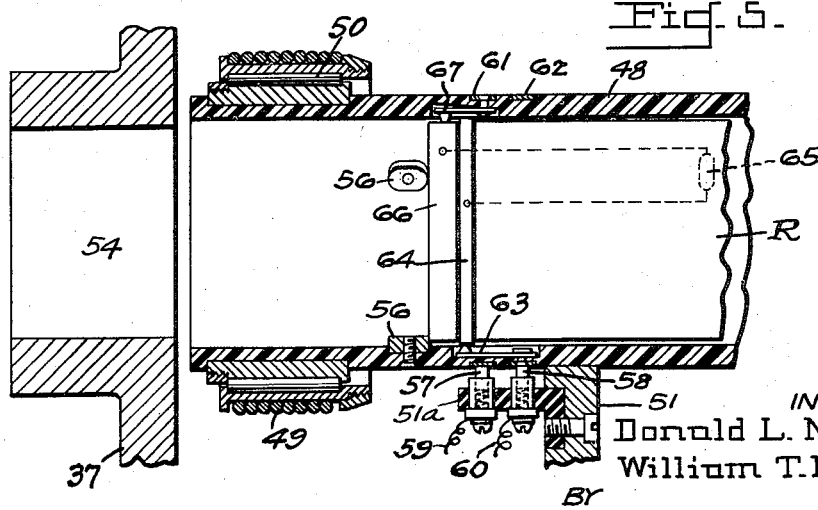
INVENTORS
Donald L. Meyers
William T. Nohelty
BY
W. E. Thibodeau + A. W. Dew
ATTORNEYS Oct. 21, 1958 D. L. MEYERS ET AL 2,856,819
AUTOMATIC ROCKET LAUNCHER
Filed June 23, 1953 5 Sheets-Sheet 3
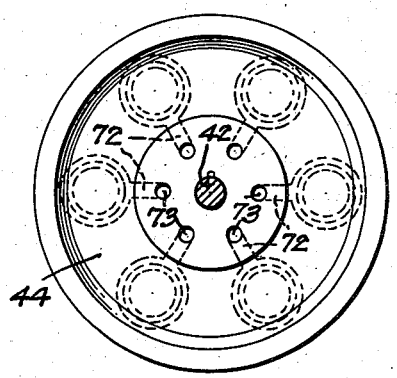
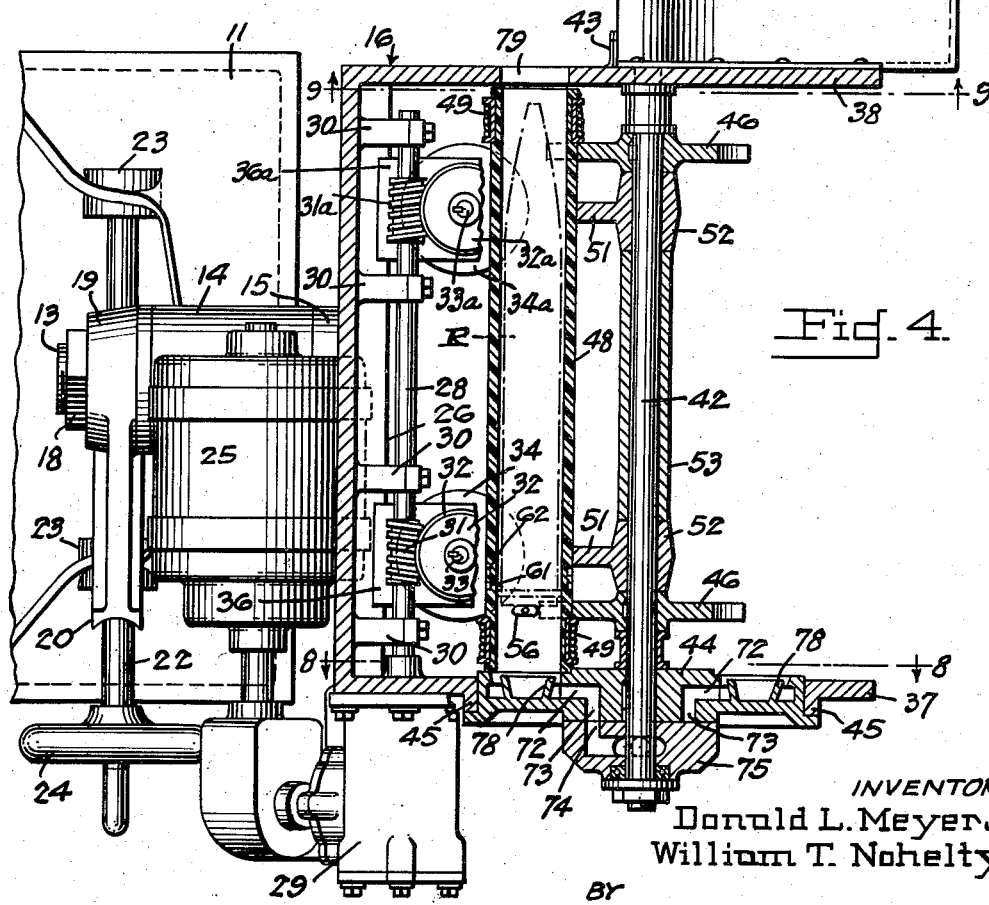
INVENTORS
Donald L. Meyers
William T. Nohelty
BY
W. E. Thibodeau & A. W. Dew
ATTORNEYS

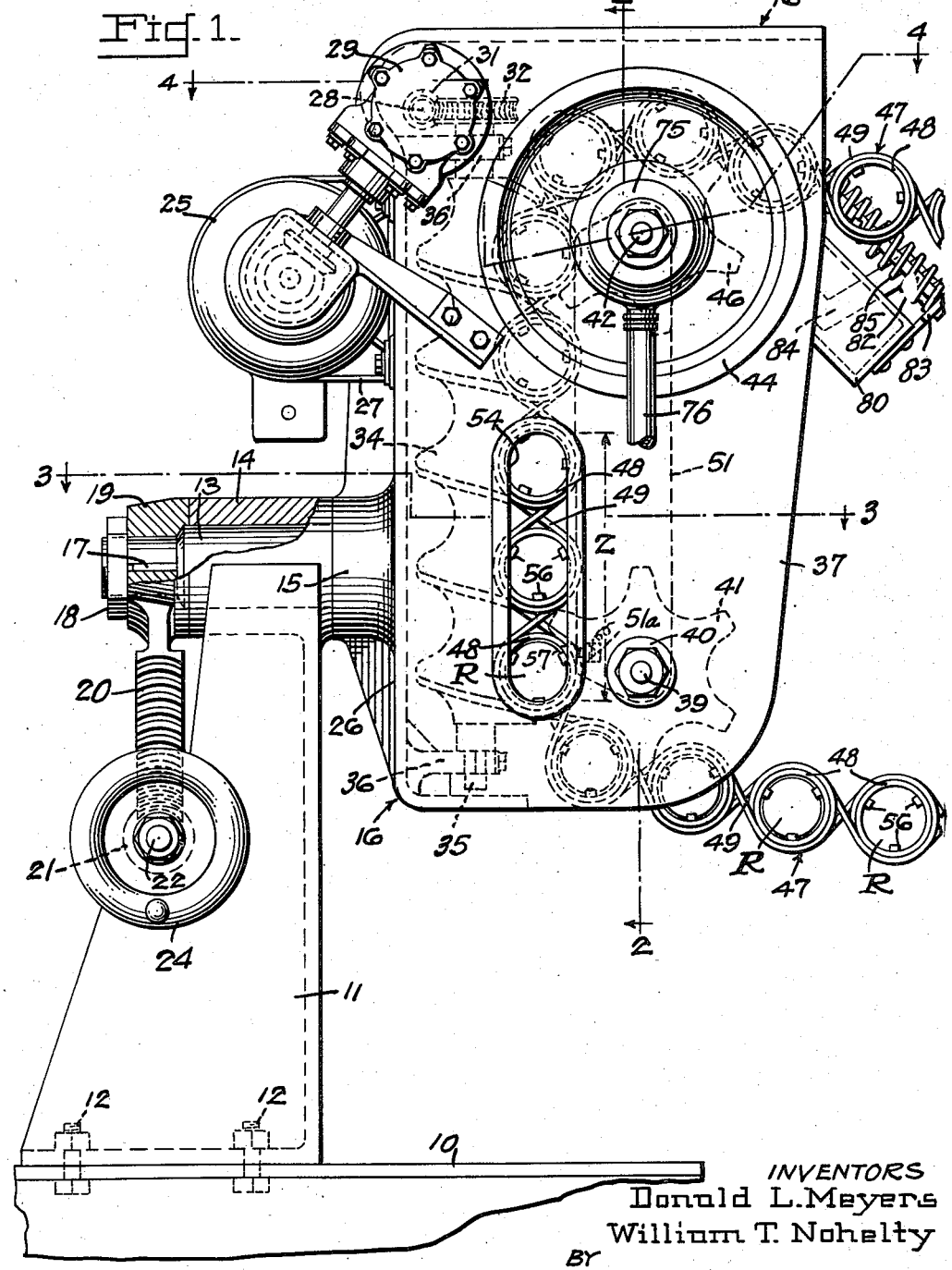

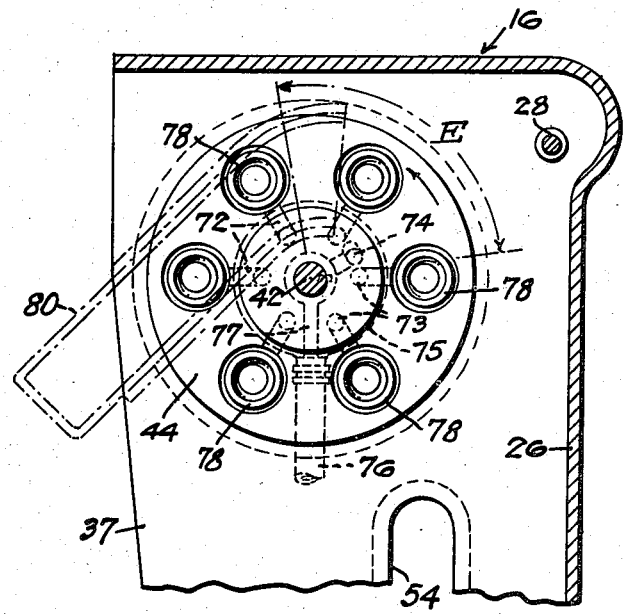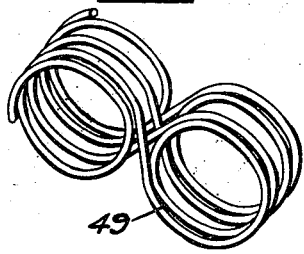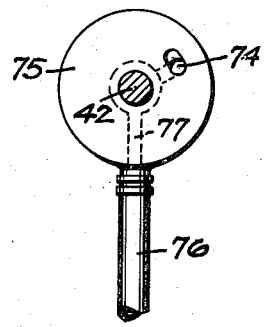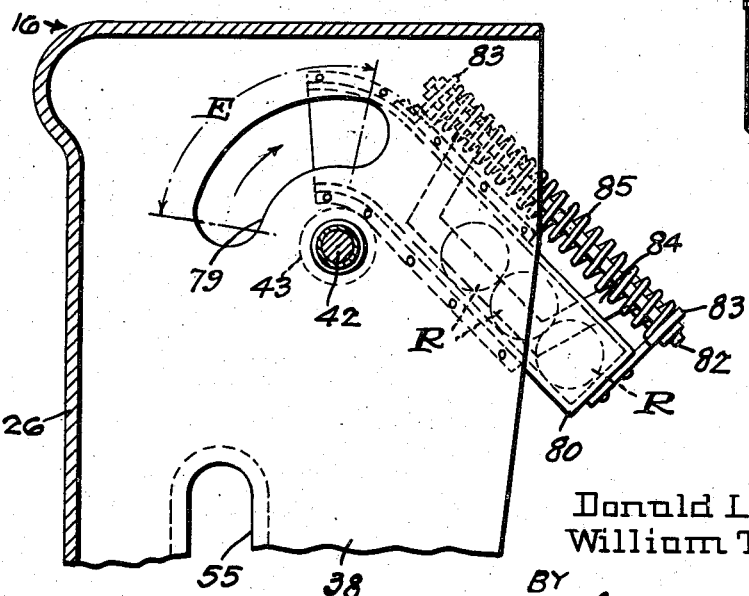

Oct. 21, 1958 D. L. MEYERS ET AL 2,856,819
AUTOMATIC ROCKET LAUNCHER
Filed June 23, 1953 5 Sheets-Sheet 5
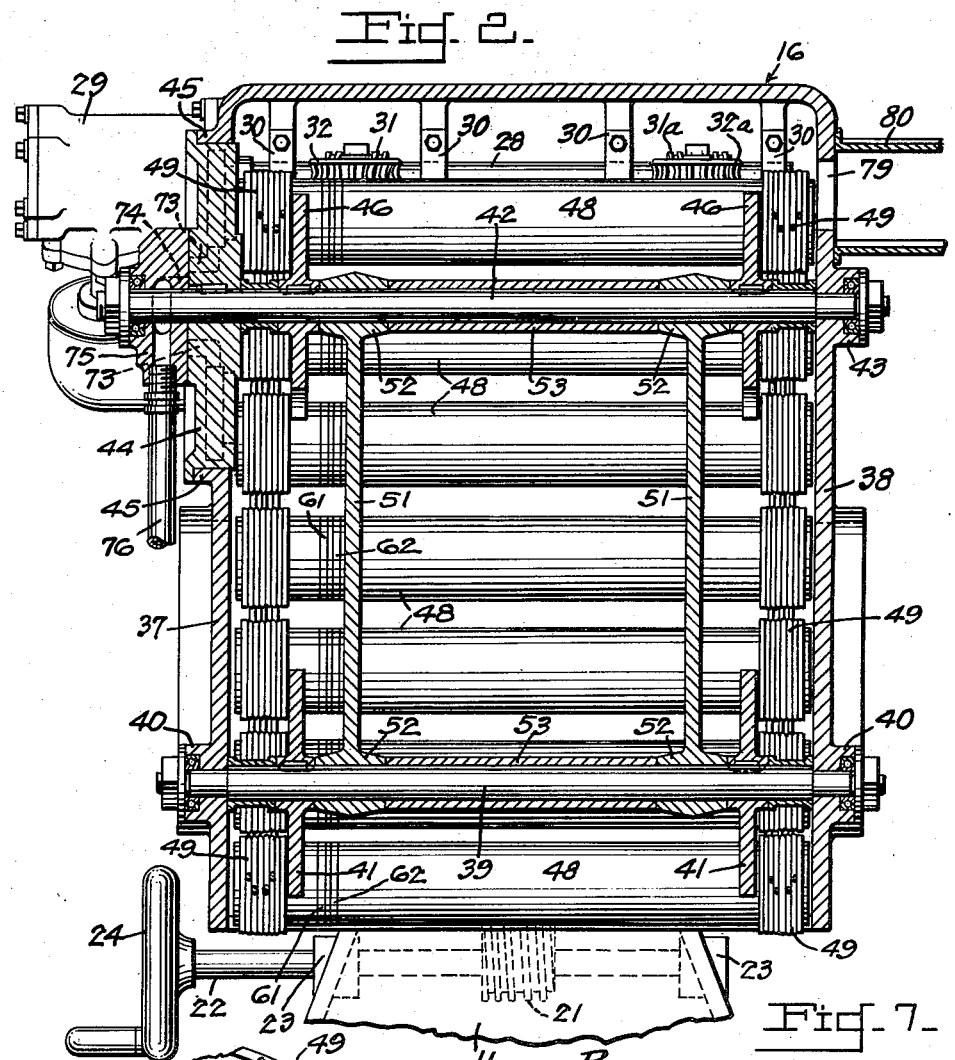
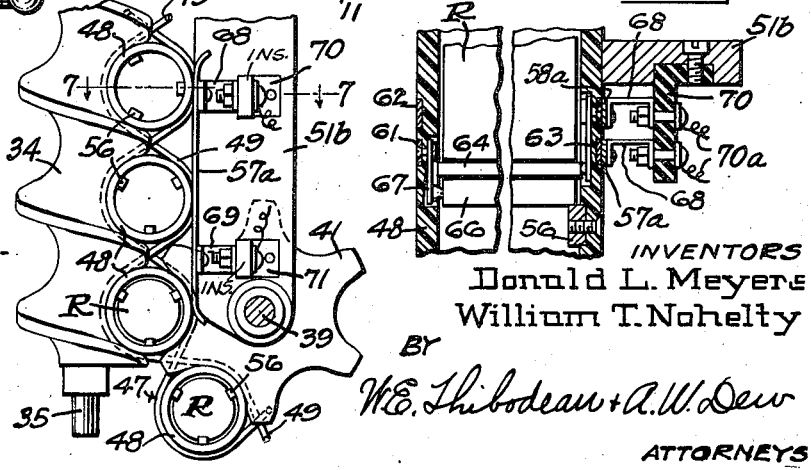
INVENTORS
Donald L. Meyers
William T. Nohelty
BY W. E. Thibodeau + A. W. Dew
ATTORNEYS

United States Patent Office 2,856,819
Patented Oct. 21, 1958

2,856,819

AUTOMATIC ROCKET LAUNCHER

Donald L. Meyers, Rock Island, Ill., and William T. Nohelty, Davenport, Iowa, assignors to the United States of America as represented by the Secretary of the Army Application June 23, 1953, Serial No. 363,703

8 Claims. (Cl. 89—1.7)

(Granted under Title 35, U. S. Code (1952), sec. 266)

The invention described herein may be manufactured and used by or for the Government for governmental purposes without the payment to us of any royalty thereon.

This invention relates to rocket launchers.

An object of the invention is to provide motor driven screw conveyor means for imparting continuous motion to a rocket carrying belt.

Another object of the invention is to provide a launcher having and endless belt composed of a number of cylindrical open end tubes flexibly connected to each other for free movement over sprocket wheels regardless of the angle of elevation of the launcher head.

Another object of the invention is to provide a launcher having a pivoted head for aiming the rockets in elevation, said head also containing the motor driven screw conveyor which accurately positions each of the tubes within a launching zone.

Another object of the invention is to provide automatic firing means on the launcher head and on the rockets, whereby each rocket will be fired in succession as it passes into a substantially predetermined position within a launching zone.

A further object of the invention is to provide a synchronously operating pneumatic valve for cooling and clearing each tube of the residue of its fired rocket propellant charge.

A still further object of the invention is to provide a receptacle on the front wall of the launcher head to receive any unfired rocket which might remain in its tube after passing the firing zone.

A still further object of the invention is to provide a flow of pneumatic pressure which is great enough to force an unfired rocket into a receptable.

Other objects and advantages will be apparent from the following detailed description and the accompanying drawings, in which:

Figure 1 is a rear elevational view of the launcher in zero elevation position.

Figure 2 is a vertical section on the line 2—2 of Figure 1.

Figure 3 is a horizontal section on the line 3—3 of Figure 1.

Figure 4 is a horizontal section on the line 4—4 of Figure 1.

Figure 5 is an enlarged fragmentary sectional view of one of the rocket tubes and one form of firing means located in the firing zone.

Figure 6 is a fragmentary view of another form of firing means.

Figure 7 is an enlarged sectional view of the firing means of Figure 6 taken on line 7—7 of Figure 6.

Figure 8 is a sectional view on the line 8—8 of Figure 4.

Figure 9 is a sectional view on the line 9—9 of Figure 4.

Figure 10 is a detail view of a stationary pneumatic pressure supply distributor.

Figure 11 is a detail view of a rotary manifold or valve mechanism for receiving pressure from the distributor member and directing it to the tubes, and Figure 12 is a detail view of one of the links for flexibly connecting the rocket carrying tubes.

Referring in detail to the drawings, particularly Figure 1, the reference numeral 10 indicates a base or mount such as a combat tank or fixed emplacement upon which the launcher is erected. At one end of the base an upstanding bearing bracket 11 is secured by the bolts 12, to the upper web of the base. A single trunnion 13, journaled in a bearing 14, forms an extension of a boss 15 which is secured to a head 16. Secured to the trunnion 13 by a key 17 and a screw threaded nut 18, is the hub 19 of a segmental worm wheel 20. The worm wheel 20 is in mesh with a worm 21 secured to a shaft 22 which is journaled in bearings 23, Figures 2 and 4, also formed on the bearing bracket 11. A hand wheel 24, mounted on the shaft 22, provides a means for rotating the gears to move the head 16 for elevational aiming, as will be hereinafter more fully explained.

An electric motor 25 is secured to an end wall 26 of the head 16 by a bracket 27, and is connected to a normally horizontal shaft 28, driven by the said motor through bevel and reducing gears, not shown, in a gear casing 29. The shaft 28 is supported in aligned bearing brackets 30 in the upper part of the head 16, and is provided with worms 31 and 31a. The worms are in mesh with worm wheels 32 and 32a respectively, keyed to stub shafts 33 and 33a which are formed integral with conveyor screws 34 and 34a respectively. The lower ends of the conveyor screws are reduced to form stub shafts 35 and 35a jounaled in bearings 36 and 36a.

The head 16 is formed with a rear wall 37 and a front wall 38 formed integral with the end wall 26. A normally horizontal idler shaft 39, (Figures 2 and 3) positioned parallel to the end wall 26, is mounted for rotation in bearings 40 in the front and rear walls, and has keyed thereto axially spaced sprocket wheels 41. A second shaft above and parallel to the idler shaft 39 is supported in a bearing 43 in the front wall and in a manifold 44, rotatable with the shaft 42 in a bearing 45 in the rear wall. The manifold 44 will be later more fully explained. The shaft 42 will hereinafter be referred to as the driven shaft. The shaft 42 has axially spaced sprocket wheels 46 keyed thereto, in vertical alignment with the corresponding sprocket wheels 41 on the shaft 39.

As will be noted from Figure 1, the two shafts 39 and 42 are vertically spaced normal to and laterally from the axes of conveyor screws 34 and 34a. The spacing is such that the tubes 48 of the rocket feed belt, subsequently described, are received in succession with a smooth fit, between contiguous teeth of the sprockets and the convolutions of the screws or worms 34 and 34a. By this construction, when the screws and sprocket shafts are driven at synchronous speed, a section of the feed belt, shown as comprising about 5 consecutive tubes, is fed in an upward direction as viewed upon Figure 1 in straight line translation so that each tube as it moves into and becomes a part of the section is moved in straight-line motion parallel with itself along a path defined as the "firing zone."

The belt is composed of spaced cylindrical open-end tubes 48 which carry the rockets to the firing zone and constitute separate launching tubes for each rocket. Each tube is flexibly connected to its adjacent tube by any suitable connections. As shown a multiplicity of wire loops 49 alternately disposed to engage tubes on both sides. Figure 5 shows a slightly modified form of loop attachment, wherein an antifriction bearing 50 interposed between the loops and the tube, permits free bending of the belt. The loops also provide flexibility when the belt is twisted about its path of movement, as it would be when the launcher head is rotated about the axis of its trunnion 13, to obtain a desired degree of elevation.

The conveyor screws 34 and 34a receive the consecutive tubes of belt 47 in their convolutions and elevate the belt from the idler sprocket 41 to the driven sprockets 46. As previously explained, the screws receive motion from worm and wheel drives 31 and 32, 31a and 32a, shaft 28 and the motor 25, and by thus elevating the belt through the firing zone drive the sprockets 46 and their shaft 42. The convolutions of the screws are of opposite hand to neutralize the net thrust which they would otherwise exert longitudinally of the tubes. Vertical guides 51 are provided with hubs 52 which support them on the shafts 39 and 42, while spacers 53 on the said shafts keep the guides properly spaced. Guides 51 bear against the tubes 48 at their surfaces opposite screws 34 and 34a and hold them against the screws for smooth translation therealong.

An elongated slot 54 in the rear wall and a similar slot 55 in the front wall define the previously-mentioned firing zone Z, as best seen in Figure 1. Figure 5 illustrates one form of firing mechanism for a conventional rocket R which has been placed in the tube 48 so as to abut the stops 56. The tubes may be made of any suitable material but a non-inflammable plastic which is also a non-conductor of electricity is preferred. The guide 51 adjacent the rear wall 37 carries a bracket 51a of dielectric material, which mounts two spring pressed contact members 57 and 58. Conductors 59 and 60 lead from these contacts or brushes from any convenient source of voltage not shown. A collector ring 61 is inset in the tube 48 in a position to engage the contact member 57, while a second inset collector ring 62 engages the contact member 58. When the circuit is closed, current will flow from the contact member 58 to the collector ring 62, a spring contact 63 inside the tube, an insulated conductor ring 64 on the rocket itself, a squib 65 for igniting the rocket propellant, a conductor band 66 on the rocket, a spring contact 67 inside the tube, the collector ring 61, the contact member 57 and back to the source through lead 59. The belt 47 moves continuously and as each tube moves upwardly through the firing zone its rocket leaves the belt by way of the firing slot 55 in the front wall 38 and the products of combustion pass out the firing slot 54 in the rear wall 37.

In view of the fact that the tubes 48 are highly stabilized by the action of the conveyor screws 34 and 34a, in combination with the vertical guides 51, as the tubes are translated in and through the firing zone, it is apparent that the members 57, 61 and 58, 62 are in contact for a sufficient time to establish an electrical circuit and that the rockets in the tubes are successively launched as they move into firing position. However, if a very high speed of travel of the belt is required, the form of firing mechanism shown in Figures 6 and 7 may be preferred. A vertical guide 51b holds the tubes 48 of the belt portion within the firing zone, against the conveyor screw 34 and carries elongated spring metal shoes or contact members 57a and 58a appearing in Figure 7. The contact members are substantially co-extensive with the firing zone and are supported by upper and lower spacing members 68 and 69 carried by insulating brackets 70 and 71, respectively, fixedly carried by guide 51b. The operation is the same as in the description of Figure 5 except only that the rocket may be fired at any position in and along the firing zone, without detraction from its accuracy of aim.

As each rocket is fired its empty tube 48 is elevated by the screws 34 and 34a until it reaches the ejection zone E, as best seen in Figures 8 and 9. The manifold 44 is keyed to and rotates with the shaft 42. Formed within the manifold are ducts 72 shown as six, equiangularly spaced and each having a port 73 for registry in succession with a port 74 formed in a stationary distributor 75. The shaft 42 turns freely in and relatively to the distributor which is held against rotation by the pipe 76 which supplies air under pressure from a source, not shown. Air pressure travels through the pipe 76 to a duct 77 in the distributor (see Figure 10), from thence by way of the port 74 to that one of the ports 73 in the manifold in registry therewith. Circular nozzles 78 are formed in the inner face of the manifold and direct air pressure from the distributor into each tube 48 as the tube passes through the ejection zone E. The nozzles 78 are circumferentially spaced to coincide with the distance between the tubes in the belt and the angular spacing of the teeth on sprockets 46, so that as the belt is fed over the sprockets 46, the tubes and the nozzles move in synchronism. The resulting blasts of air into, over and along the tubes from which rockets have just been fired, cools the walls of the tubes and ejects any bits of smouldering or unburned propellent powder particles remaining in the tubes. A radial slot 79 is formed in the front wall 38 of the head 16, and forms the exit for the products of combustion expelled from the tubes as blasts of air under pressure are applied thereto.

In the event that some of the rockets fail to fire or develop a hang fire, they will remain in their tubes and become a serious hazard to the launcher and crew. In order to capture and control them a box-like container 80 having an open end adjacent the radial slot 79, is secured to the front wall 38 of the head adjacent the ejection slot 79, to receive the ejected rockets. See Figure 4. A door 81 is pivoted on a rod 82 carried in bearings 83, by means of a bracket 84 and held in a closed position by the helical spring 85. The door can be pushed open by a hang fire rocket when it starts its flight and will quickly close to retain any other dud rockets resting therein. When any rocket fails to fire as it passes through the launching zone, it is subsequently blown out of its tube by the blast of air directed into its tube as the port 73 for that tube registers with stationary pressure port 74. From Figure 8 it will be noted that this occurs as the corresponding rocket tube begins to move transversely over and across the upper sprockets, so that the dud rocket has a horizontal component of movement as it emerges from, or is blown out of its tube. The air pressure, belt speed, time of air pressure application and position of the open mouth of box 80 are so coordinated that the dud moves laterally into the box where, if it subsequently fires, it moves forwardly out of the box without damage.

The belt 47 is endless and its portions or passes not shown upon the drawing may be guided by pairs of sprockets similar to 46 and power driven in synchronism therewith to propel and guide the belt with minimum load upon motor 25. Such portions will include a loading pass where empty tubes 48 are loaded with rockets, either automatically or by hand. Head 16 may have a maximum angular elevation up to 65° without harm to the wire loops 49 of the belt.

The operation will be obvious from the foregoing description. With the belt loaded with rockets, hand wheel 24 is actuated to give the proper elevation to those tubes within the firing zone. The switches, not shown controlling motor 25 and any other motors connected to drive belt 47 are closed to drive the belt at uniform speed. Simultaneously the firing circuit including leads 59 and 60, Figure 5 or 70a, Figure 7, is closed, and as each rocket in turn, moves into and along the firing zone, it is fired and launched. Due to the very precise and accurate feed of tubes 48 along and through the loading zone, the accuracy is equal to that of a like rocket fired from a fixed or emplaced launcher tube, while, because the belt and its tubes moves continuously at uniform speed a more rapid rate of fire is attainable. Furthermore, as the belt does not have to be stopped for an interval while each successive rocket is fired, the belt and the driving parts thereof may be made lighter and of simpler construction. As each rocket is within the firing zone for an appreciable period of time, the time between closing the firing circuit and actual movement of the corresponding rocket out of its tube, is not critical so that different kinds or types of rockets of equal caliber may be launched without change.

It will be apparent to those skilled in the art that a rocket launcher is herein presented which can be fired at a high rate of speed without the usual strains of starting and stopping a heavy machine.

While we have disclosed a form of the invention presently preferred by us, various changes and modifications will occur to those skilled in the art after a study of the present disclosure. Hence the disclosure is to be taken in an illustrative rather than a limiting sense; and it is our desire and intention to reserve all modifications falling within the scope of the subjoined claims.

Having now fully disclosed the invention, what we claim and desire to secure by Letters Patent is:

1. The combination with a pivoted head of a belt comprising a plurality of rocket carrying tubes, screw means for driving the belt through the head, a prime mover for the said screw means, said head having successive openings along the path of said belt defining a launching zone and a scavenging zone, in succession, means automatically operable to initiate the propelling charge in each rocket as its tube moves into and along said launching zone, guide means fixed with the head for holding a predetermined plurality of successive belt tubes, in contact with the said screw means for guided aimed translation in and along said launching zone, rotatable means within the head for conveying the belt to move the tubes in succession past said scavenging opening, after leaving said launching zone, and valve means connected to said rotatable means in position for axial alignment with each tube in succession for releasing a blast of compressed air into each tube subsequent to firing of a rocket therefrom.

2. In an automatic rocket launcher, a head, a pair of spaced parallel feed screws journaled in said head, means connecting said screws for synchronous rotation, a feed belt comprising a plurality of open-end launcher tubes flexibly connected in parallel side-by-side relation, guide means carried by said head for holding a predetermined plurality of successive belt tubes within the convolutions of said screws whereby on rotation of said screws said predetermined plurality of tubes are moved in guided aimed translation through a launching zone, means operated by and in response to movement of each successive tube in and along said zone to initiate the propelling charge of a rocket therein to launch the same, a shaft journalled in said head, sprockets fixed on said shaft and receiving and guiding successive tubes as they emerge from the screws, compressed air nozzles carried by one said sprocket for alignment with successive tubes, and valve means operated by rotation of said shaft to direct a blast of compressed fluid into nozzle as it moves into alignment with a respective tube.

3. The combination with a pivoted head of a belt comprising a plurality of rocket carrying tubes; a launching zone in the head; screw means for driving the belt through the launching zone; automatic firing means in the launching zone; a scavenging zone in the head; rotating means comprising a shaft and sprocket wheel for conveying the belt from the said screw driving means through the scavenging zone; compressed air valve means secured to the said shaft and moving in synchronism therewith, said air valve having outlet nozzles axially aligned with the said tubes as they are conveyed through the scavenging zone; and a fixed compressed air distributor having a single port for supplying air pressure to the outlet nozzles as they are brought into registery therewith to cool and clean the tubes.

4. In an automatic rocket launcher, a belt comprising a plurality of tubes open at both ends and flexibly connected in spaced parallel side by side relation, each said tube being adapted to contain an electrically-fired rocket and to serve solely as an aiming and guiding means for launching said rocket therefrom, a firing head comprising a box-like structure having aligned elongated openings in its front and rear walls defining a firing zone, said openings having a dimension in the direction of travel of said belt through said head equal at least to the distance between axes of a plurality of said tubes, a pair of screws journaled in said head in parallelism with said direction of travel and spaced in the direction of alignment of said openings, said screws being adapted to receive a plurality of said tubes between successive convolutions of the threads thereof, abutment means fixed with said head in parallelism with said screws, a motor, a driving connection between said motor and said screws operable to continuously rotate said screws by and in response to operation of said motor, whereby a plurality of said tubes are continuously translated through said head between said screws and abutment means, without angular movement with respect to said head, means operated by said motor and driving said belt in synchronism with rotation of said screws, and means fixed with said head to make electrical firing contact with each rocket throughout the path of travel through said zone until fired.

5. An automatic rocket launcher as recited in claim 4, a base, means journaling said head on said base for angular movement in a plane determined by the axes of said screws whereby aimed launching of the rockets fired from said tubes is effected.

6. An automatic rocket launcher comprising a head including front, rear and side walls, there being aligned elongated openings in said front and rear walls defining a rocket firing zone, said openings being of a total dimension equivalent to the diameters of a predetermined number of rockets, a bearing bracket mounted to said side wall of said head for pivotal movement of said head in elevation, a belt comprising a plurality of open-ended tubes, a pair of inset collecting rings on the outer peripheral surface of each of said tubes, said tubes being flexibly secured together in side by side relation, each tube adapted to receive a rocket including conductor bands and a firing squib, each said tube serving as a sole guiding means for aiming said rocket, means carried by said head to move a predetermined plurality of said tubes consecutively at a constant speed through said zone, means fixed with said head to make electrical firing contact with each said rocket throughout the path of travel through said zone until fired comprising, an insulating bracket secured to said rear wall, a pair of insulated spring biased contact plungers, connected to a source of electrical energy, mounted on said bracket and normally contacting said collector rings on said tubes when said tubes are in said zone and spring contact members mounted within the wall of said tubes adapted to complete electrical contact between said conductor bands on said rocket, said plunger and said collector rings on said tubes.

7. An automatic rocket launcher comprising a head including front, rear and side walls, there being aligned elongated openings in said front and rear walls defining a rocket firing zone, said openings having a total dimension equivalent to the diameters of a predetermined number of rockets, a base, means mounting said head for pivotal movement in elevation on said base, a belt comprising a plurality of open-ended tubes, said tubes being flexibly secured together in side by side relation, each tube adapted to receive a rocket and to act as a sole means to guide and aim said rocket throughout the path of travel through said firing zone until fired, firing means for said rockets fixed with said head comprising a pair of vertical guide members adapted to align said tubes in said firing zone, an elongated spring metal shoe affixed to each guide member and adapted to contact a predetermined number of said tubes in said zone, means carried by said tubes to provide electrical contact between said shoes and the firing elements of said rockets, and electrical contact members carried by and insulated from said guide members, said members being connected to said shoes and providing electrical connection between said shoes and a source of electrical energy, said firing means permitting firing of said rockets at a predetermined position in and along said firing zone.

8. In an automatic rocket launcher, a belt comprising a plurality of tubes open at both ends and flexibly connected in spaced, parallel side by side relation, each said tube being adapted to contain an electrically fired rocket and to serve as a sole aiming and guiding means for said rocket, a base, a launching head pivotally mounted to said base for angular adjustment in elevation, said head comprising a front, an end and a rear wall, there being a vertically disposed slot in said front wall and said rear wall in aligned relation with each other, said slots defining a firing zone for said rockets and having a total dimension in the direction of travel through said head equal at least to the distance between axes of a plurality of said tubes, a scavenging zone in said head, means for continuously feeding said belt into said head, elevating said belt through said firing zone and moving said belt through said scavenging zone comprising, a first plurality of vertically spaced bearings integral to said wall, a pair of elevating screws journaled in said bearings, said screws being disposed in parallelism with said direction of travel and spaced in the direction of alignment of said openings, a motor secured to said end wall, a second plurality of horizontally spaced bearings integral to said end wall, a shaft journaled in said second plurality of bearings, driving connections between said motor, said shaft and said screws whereby both said screws are simultaneously rotated, a pair of vertically spaced shafts journaled between said front and rear walls, a pair of axially spaced idling sprockets mounted on said pair of shafts, said sprockets defining teeth spaced with relation to said tubes in said belt whereby said sprockets are driven at a synchronous speed with said screws and means fixed with said head to make electrical firing contact with each said rocket throughout the path of travel through said firing zone until fired.

References Cited in the file of this patent
UNITED STATES PATENTS

| | | |
|---|---|---|
| 2,416,768 | Monner | Mar. 4, 1947 |
| 2,427,374 | Walker | Sept. 16, 1947 |
| 2,450,929 | Ashworth et al. | Oct. 12, 1948 |
| 2,468,216 | MacDonald | Apr. 26, 1949 |
| 2,485,715 | Eastman | Oct. 25, 1949 |
| 2,522,457 | Martin | Sept. 12, 1950 |
| 2,630,740 | Robert et al. | Mar. 10, 1953 |
| 2,630,741 | Robert et al. | Mar. 10, 1953 |
| 2,649,840 | Davidson | Aug. 25, 1953 |

FOREIGN PATENTS

| | | |
|---|---|---|
| 632,599 | Great Britain | Nov. 28, 1949 |
| 639,766 | Great Britain | July 5, 1950 |